United States Patent [19]

Licitis

[11] 4,028,845

[45] June 14, 1977

[54] LAYERED SKIN DOLL

[75] Inventor: Gunars Licitis, Lombard, Ill.

[73] Assignee: Marvin Glass & Associates, Chicago, Ill.

[22] Filed: Jan. 21, 1976

[21] Appl. No.: 650,894

[52] U.S. Cl. .................................. 46/164; 264/310
[51] Int. Cl.² .......................................... A63H 3/00
[58] Field of Search ............ 46/151, 156, 160, 164, 46/172; 264/310

[56] References Cited

UNITED STATES PATENTS

| | | | |
|---|---|---|---|
| 3,273,280 | 9/1966 | Karton | 46/164 |
| 3,541,192 | 11/1970 | Shapero | 264/310 |
| 3,900,640 | 8/1975 | Vecchiotti | 264/310 |

*Primary Examiner*—Louis G. Mancene
*Assistant Examiner*—Robert F. Cutting
*Attorney, Agent, or Firm*—Mason, Kolehmainen, Rathburn & Wyss

[57] ABSTRACT

A figure toy or doll having a layered plastic skin including a molded soft, pliable outer skin exteriorly of a substantially rigid, molded inner skeletal shell, and a method for making the same. The figure toy includes a molded smooth, pliable outer skin covering defining the exterior surface and shape of the doll, which is bonded to a substantially rigid molded inner wall interiorly thereof, which provides support for the doll. The method includes the steps of coating the interior walls of a suitable mold cavity with a generally soft plastisol and gelling the plastisol by heating the mold cavity during rotation thereof to form a soft outer covering or skin; coating the interior of the skin with a second plastisol which will cure to form a rigid plastic skeleton to give support to said outer shell; pressurizing the mold cavity; and heat curing both the first and second plastisol during rotation of the mold cavity, then recovering the doll from the mold.

8 Claims, 7 Drawing Figures

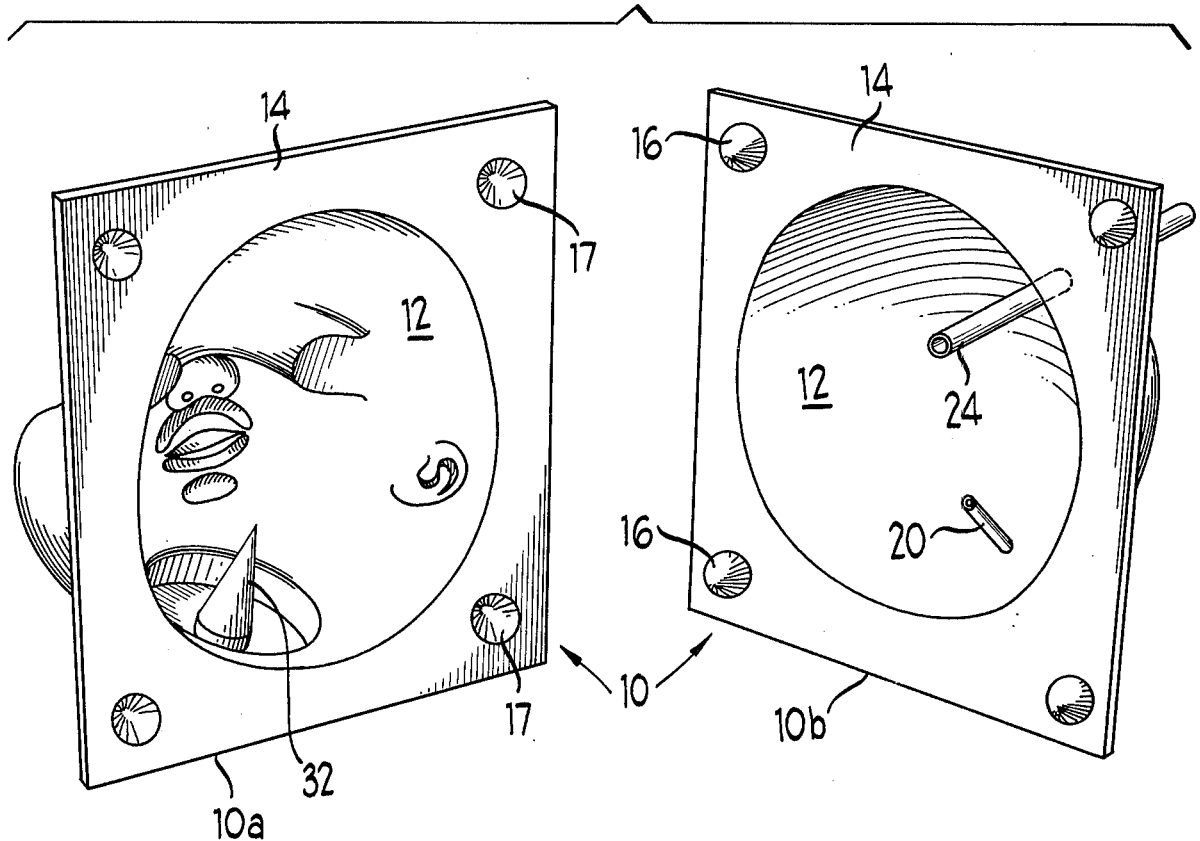
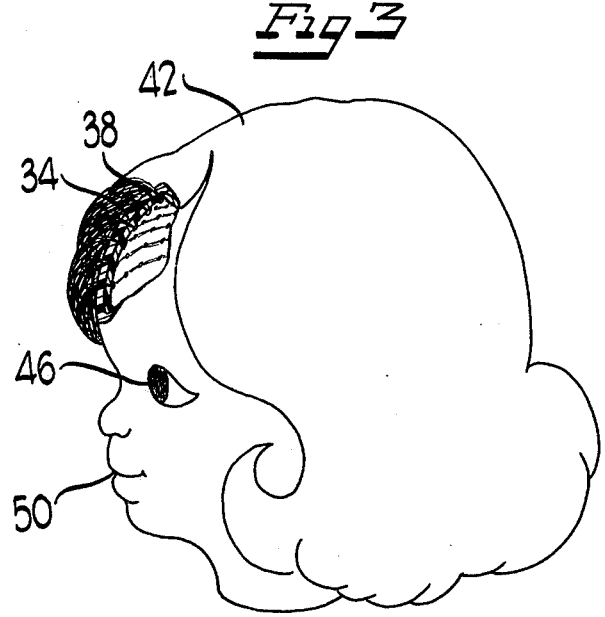

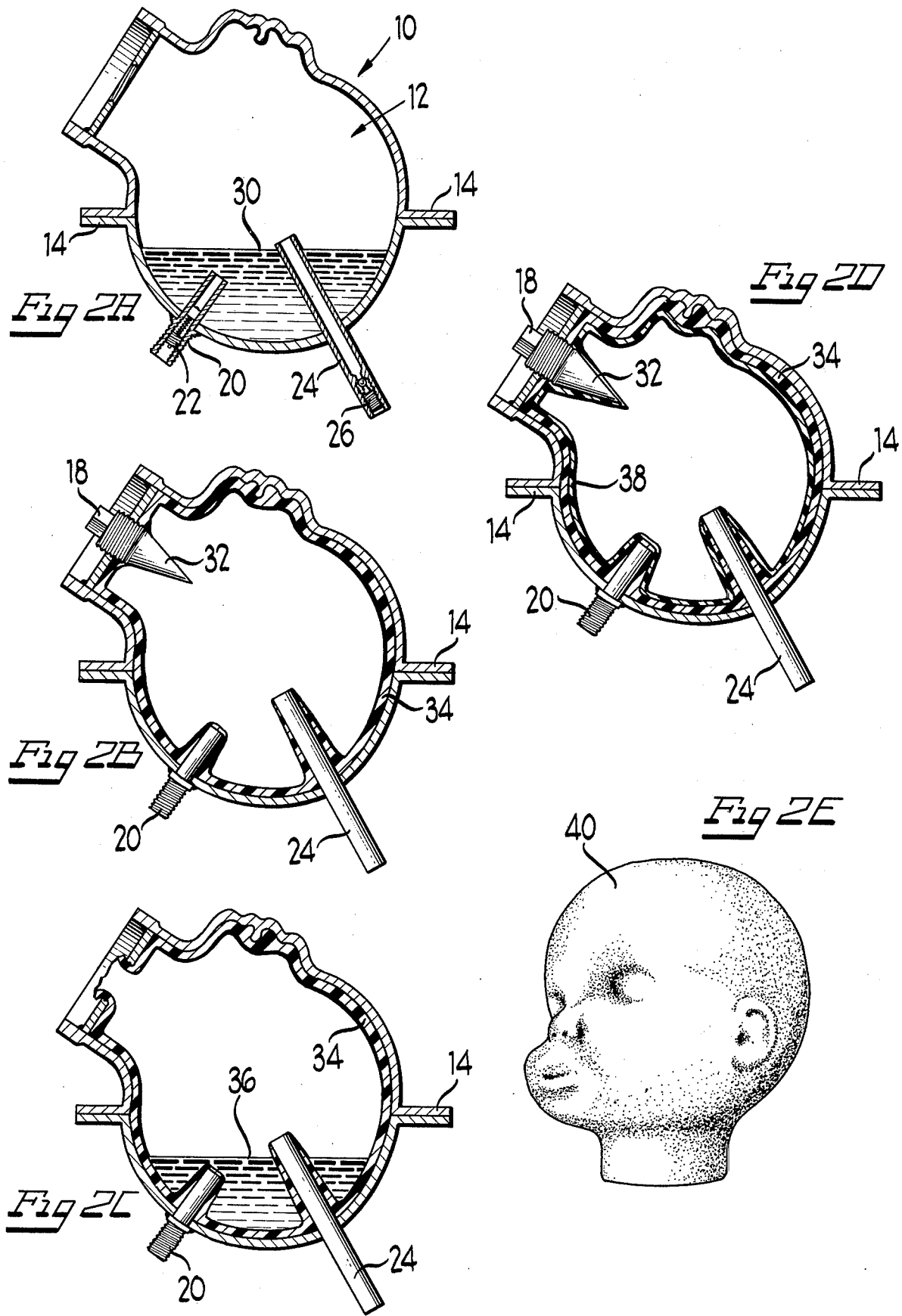

LAYERED SKIN DOLL

BACKGROUND OF THE INVENTION

1. Field of the Invention

This invention relates to figure toys and dolls and more particularly to a doll having a soft, pliable outer layer or surface substantially resembling the softness of the skin of a human.

2. Description of the Prior Art

In the past, various attempts have been made at developing a doll having a soft pliable outer skin exteriorly of a more rigid inner shell layer. One method is disclosed in U.S. Pat. No. 3,852,389 which describes a method for manufacturing a laminated doll skin having a generally pliable outer layer. The above patent, however, provides for the use of a plastisol including a blowing agent which, when cured, yields a product having a very porous or sponge-like characteristic. In attempting to achieve a very smooth, pliable outer skin layer, many difficulties have been encountered, particularly in the bonding between the inner and outer layers. Since a large amount of heat is required to cure the inner layer and bond the inner layer with the outer pliable layer, scorching or burning of the outer layer often resulted, or the inner layer was not satisfactorily cured. In an attempt to overcome this difficulty, stronger and less flexible outer coverings were used which did not scorch so easily. However, when a portion of the figure toy would be bent, the impervious outer skin did not fold or crease in a manner at all similar to that of normal human skin. In further attempting to produce life-like properties, various plastisol combinations were utilized to form the outer skin using the previous techniques. Satisfactory results were not obtainable and the figure toy remained too sitff and the skin did not appear particularly life-like.

SUMMARY OF THE INVENTION

The object of the present invention is to provide a figure toy or doll and a method for making a figure toy having an outer, pliable, smooth or impervious skin covering integral with a substantially rigid structural sub-layer.

The above and other objects of the present invention are accomplished by providing a mold having a cavity therein defining the outer contours and configurations of the figure toy or other suitable object. The mold is first filled with a first plastisol containing a relatively large amount of plasticizer to produce a very pliable outer skin for the figure toy. The interior mold cavity is entirely covered by the plastisol by rotocasting or slush molding and then heated to gel the first plastisol on the walls of the mold. A second plastisol composition having a substantially smaller amount of plasticizer is then introduced to the interior of the mold and coats the interior of the gelled outer layer by rotocasting or slush molding techniques. Pressure is introduced into the mold which thereafter again is heated to cure both the first and second plastisol and to bond them together to produce a figure toy having a soft, pliable outer skin covering securely bonded to an inner rigid backing layer.

Other objects, features and advantages of the invention will be apparent from the following detailed description taken in connection with the accompanying drawings.

BRIEF DESCRIPTION OF THE DRAWINGS

FIG. 1 is a perspective view of a disassembled mold suitable for use with the method of the present invention;

FIG. 2a is a vertical section of the assembled mold after a predetermined amount of the first plastisol has been introduced therein;

FIG. 2b is a vertical section, similar to FIG. 2a, after the first plastisol composition has been coated and gelled on the interior walls of the mold cavity;

FIG. 2c is a vertical section of the mold, similar to FIG. 2a, showing the introduction of a second plastisol composition into the mold;

FIG. 2d is another vertical section after the second plastisol has been coated on the interior of the first plastisol layer, with the combination of the two plastisols cured;

FIG. 2e is a perspective view of the end product after removal by disassembling the mold; and FIG. 3 is a perspective view similar to FIG. 2e showing the final product and the method of attaching hair to the head of the figure toy.

DETAILED DESCRIPTION OF THE INVENTION

Although the method of the present invention can be used to produce figure toys and other objects, the description herein with reference to the accompanying drawings describes the method with reference to the manufacture of a doll head as exemplary of the present invention and no unnecessary limitations should be understood from this example.

A suitable mold, generally designated 10, is provided having an internal cavity 12 of the desired shape and contour of the article to be molded. The mold 10 includes two portions 10a and 10b which are fastened together by means of a generally square perimetal flange 14. Detent means in the form of a combination boss 16 and recess 17 are provided on the flanges 14 for alignment of the mold cavity. One portion of the mold 10a includes a threaded plug 18 which permits easy access to the interior of the mold cavity for filling with the plastisol compositions, to be described in greater detail hereinafter.

Additionally, a one-way pressurizing valve 20 (FIG. 2A) is provided to permit the introduction of pressure into the interior of the mold cavity 12. The pressurizing valve 20 has a spring biased plunger 22 (FIG. 2A) similar to that found on pneumatic tires to prevent the escape of pressurized air in the mold. A second, optional pressure release valve 24 is provided to permit escapement of gas from the interior of the mold should the gas become extremely pressurized during the heating process which pressure might ultimately damage or rupture the mold. Preferably, the pressure release valve 24 includes adjustment means 26 to permit regulation of the amount of pressure required to operate the release valve 24.

The method of the present invention is most easily described with reference to FIGS. 2A-2E which illustrate the representative, sequential steps employed by the present invention. FIG. 2A shows the mold cavity 12 after it has been partially filled by a predetermined amount of a first plastisol 30. Note in FIG. 2A that the plug 18 has been removed for filling. After the plastisol 30 has been introduced the plug 18 is replaced. The first plastisol 30 then is coated on the interior walls of the cavity 12 by rotocasting or slush molding to form a layer 34 and gelled by heating the mold to a predetermined temperature, approximately 300° F. Preferably, the first plastisol composition 30 is not completely cured at this time but merely gelled or solidified to the extent that the plastisol layer 34 will retain the form and shape of the interior walls of the mold cavity 12. Note, in FIG. 2B, that the plastisol layer 34 does not cover a tapered cone-shaped end 32 of the plug 18. This end of the plug 18 is covered with a relatively friction free surface such as Teflon or the like to prevent the plastisol from adhering to the end of the plug which is later removed, as described in detail below. The plastisol composition 34, however, will cover the ends of the pressurizing valve 20 and the presssure release valve 24. The covering of the ends of these valves by the plastisol composition is not detrimental to the process since the introduction or the release of pressurized air from the cavity 12 can be accomplished by the pressurized air itself rupturing the portion of the plastisol 30 covering the end of the valve. In this second step, represented by FIG. 2B, it is desirable to merely gel the first plastisol 30 and not completely cure it. However, the process will work in either event.

The plastisol composition utilized to form this first or outer skin of the doll's head should be selected with a durometer to provide a very pliable, soft, impervious layer which resembles as near as possible human skin. These properties are controlled to a great degree by the amount of plasticizer in the composition. Preferably, a substantially large amount of plasticizer is provided in this first plastisol composition 30 so that the outer skin layer 34 is pliable, especially to permit bending or wrinkling, for example, in an articulated figure toy or doll. However, the plastisol composition used should be free of any blowing agents which tend to provide a porous, unrealistic foam-type surface.

FIG. 2C represents the next step in the process in which a second predetermined amount of a different durometer plastisol composition 36 is introduced by removal of the plug 18, as seen in FIG. 2C. This second filling can be performed while the mold is still warm from the first partial curing or gelling of the first plastisol 30 and thus conserve energy and time since it will not require as long a time to reheat the mold. The mold then is rotated several times to coat the interior of the first plastisol layer 34 with a second plastisol layer 38 without adding additional heat to the mold.

The next step then is to pressurize the mold by adding air under pressure through the pressurizing valve 20 to the interior of the mold. The amount of pressure developed within the mold depends on the strength of the mold itself and in practice it has been found that 24 psi is sufficient for the current invention. Alternatively, the pressure can be introduced into the mold prior to the above-mentioned step of rotating the mold to coat the interior of the first layer 34. This pressurization of the mold accomplishes two functions which permits manufacturing of the article under the present method which have heretofore been impossible. The added pressure causes the second plastisol composition 36 to form a secure bond at the interface between the layers of plastisol 34 and 38 in the final product, not only due to the force of the pressure but the pressure enhances the heat transfer from the mold through the first plastisol layer 34 to the second plastisol 38. Heretofore, attempts have been made to manufacture a laminated skin doll but the bonding between the laminant layers has been insufficient and resulted in relative movement between the layers causing deformities in the appearance of the doll. Lower pressure, i.e. 5 psi, has been found to be too low to cause a sufficient bond to be generated and, thus, spots and the like have occurred which are undesirable and visible in the finished product. Additionally, it is believed that the pressure applied by the air to the plastisol layers provides for additional or better heat conductivity from the mold to the innermost plastisol 38 and will thus prevent scorching of the first skin layer 34 which had resulted in prior attempts without the use of a pressurized mold.

The final step then is to rotationally cast or slush mold and cure the second plastisol 36 into a layer 38 interiorly adjacent the first layer 34 and thus completely cure the first layer 34 and the second layer 38 and to bond the two layers together.

The plastisol composition utilized to form the inner layer 38 should be selected to provide a relatively rigid backing to the outer pliable layer 34. Plastisol compositions having a durometer in the range between 45 and 90 upon complete curing can be used. Also, it is again desirable that the second plastisol composition 36 contain no blowing agents which normally will provide a less resilient or sponge-like layer.

Finally, the mold 10 is removed from the cured product to produce the doll's head 40 as shown in FIG. 2E. As can be seen, the outer skin 34 of the doll's head conforms to the internal surfaces of the mold cavity and thus any desired shape can be produced in practicing the method of the present invention.

FIG. 3 shows a final doll's head which includes hair 42 which is attached through both layers of skin 34 and 38 by a conventional hair rooting machine. Additionally, colorings can be added, as at the eyes 46 and lips 50, to present an extremely realistic doll.

As seen in FIG. 2B, the contours of the mold which define the lips, nose, eyes, ears, of the final product are filled by this first plastisol composition 30 by a simple leveling process during the rotocasting or slush molding process while the gellation of the first plastisol composition 30 occurs. This provides a thicker layer portion in the area of the lips, nose, ears, etc. to provide additional flexibility to simulate actual human features.

The foregoing detailed description has been given for clearness of understanding only and no unnecessary limitations should be understood as some modifications will be obvious to those skilled in the art.

I claim:

1. A multiple layered figure toy, comprising:
    a pliable impervious outer smooth molded plastic skin of predetermined shape defining the exterior features of the figure toy; and
    a substantially rigid impervious inner molded plastic layer of similar material, interiorly cured with said outer skin retaining said outer skin in its predetermined shape and defining an internal cavity within the figure toy.

2. The figure toy of claim 1 wherein said outer skin and said inner wall are heat and pressure cured together simultaneously to prevent relative movement therebetween.

3. The figure toy of claim 1 wherein the outer skin and the inner wall are substantially homogeneous solids, free of entrapped voids, and differing only in their respective resistance to deformation.

4. The figure toy of claim 1 wherein the figure toy comprises a head portion having lips, a nose and ears substantially filled by said outer pliable skin with an increased thickness in an attempt to approximate reality.

5. A method of making a multiple layered figure toy, comprising the steps of:
providing a suitable mold cavity having a predetermined size and shape for said figure toy;
introducing an amount of first plastisol composition into said cavity of a durometer to provide a soft impervious outer skin;
partially heat curing said first plastisol as a layer on the interior walls of said mold cavity by heating and rotating the mold cavity;
introducing an amount of second plastisol composition into said mold cavity on the interior of said first plastisol layer, said second plastisol composition having a durometer substantially higher than said first plastisol composition to provide a rigidifying backing layer for said first plastisol layer;
pressurizing said mold cavity to a predetermined pressure; and
heat curing the second plastisol on the interior side of said first plastisol layer while simultaneously completing the curing of said first layer during rotation of the mold cavity to produce a figure toy having a pliable outer skin portion reinforced by a substantially rigid inner wall portion therebehind.

6. A method of making a doll having a substantially life-like skin, comprising the steps of:
providing a mold having a suitable mold cavity having the desired shape of a doll to be formed;
introducing a predetermined amount of a first plastisol composition into said mold cavity, the first plastisol composition having a relatively low durometer when cured;
coating the inner walls of said mold cavity with said first plastisol composition;
heating said mold when said first plastisol is coated thereon to partially cure said plastisol;
introducing a predetermined amount of a second plastisol composition into said mold cavity, the second plastisol composition having a substantially higher durometer when cured;
coating the inner walls of said first cured plastisol with said second plastisol composition;
introducing a predetermined amount of pressure into said mold cavity to increase the heat conductivity between the mold, the first plastisol, and the second plastisol; and
heating said mold a second time to simultaneously complete curing of said first plastisol and cure and bond the second plastisol to the interior of said first plastisol to provide a figure toy having a soft, pliable outer skin bonded to a substantially rigid inner skeleton.

7. The method of claim 6 wherein the mold cavities defining the extremities of said figure toy are substantially filled by said first plastisol.

8. The method of claim 6 wherein said mold is rotated during said heating steps.

* * * * *